United States Patent
Alothman et al.

(10) Patent No.: US 12,524,075 B2
(45) Date of Patent: Jan. 13, 2026

(54) MULTI CHANNEL DATA AGGREGATION BASED DATA COMPRESSION

(71) Applicant: The Regents of the University of California, Oakland, CA (US)

(72) Inventors: Abdullah Mohammed Alothman, Dhahran (SA); Vikash Gilja, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 91 days.

(21) Appl. No.: 18/701,758

(22) PCT Filed: Oct. 18, 2022

(86) PCT No.: PCT/US2022/078328
§ 371 (c)(1),
(2) Date: Apr. 16, 2024

(87) PCT Pub. No.: WO2023/069968
PCT Pub. Date: Apr. 27, 2023

(65) Prior Publication Data
US 2025/0224804 A1    Jul. 10, 2025

Related U.S. Application Data

(60) Provisional application No. 63/256,863, filed on Oct. 18, 2021.

(51) Int. Cl.
*G06F 3/01*    (2006.01)
*A61B 5/37*    (2021.01)
(Continued)

(52) U.S. Cl.
CPC .............. *G06F 3/015* (2013.01); *A61B 5/37* (2021.01); *A61B 5/372* (2021.01); *A61F 4/00* (2013.01); *G16H 40/63* (2018.01)

(58) Field of Classification Search
CPC .............................. A61B 5/372; H04N 19/90
(Continued)

(56) References Cited

U.S. PATENT DOCUMENTS 11,662,819 B2 * 5/2023 Connor ................... G06F 3/041
345/173
2012/0108997 A1  5/2012 Guan et al.
(Continued)

OTHER PUBLICATIONS

Carmena, J. M. et al., "Learning to Control a Brain-Machine Interface for Reaching and Grasping by Primates," PLoS Biol, vol. 1, No. 2, pp. 193-208, Oct. 2003.
(Continued)

*Primary Examiner* — Calvin C Ma
(74) *Attorney, Agent, or Firm* — FisherBroyles, LLP (57) ABSTRACT

In some embodiments, there is provided a system, which comprises at least one computer that is communicatively coupled with at least one sensor. The at least one sensor is embedded in a brain and configured to detect a plurality of activity data associated with neurons of the brain, implement a compression algorithm on the plurality of activity data by comparing a first entropy value associated with a first set of data points of the plurality of activity data with a second entropy value associated with a second set of data points of the plurality of activity data, and combining the first set of data points responsive to determining that the first entropy value is lower than the second entropy value, and transmit the combination of the first set of data points to the at least one computer.

22 Claims, 6 Drawing Sheets

(51) Int. Cl.
  *A61B 5/372* (2021.01)
  *A61F 4/00* (2006.01)
  *G16H 40/63* (2018.01)
(58) Field of Classification Search
  USPC .......................................................... 345/156
  See application file for complete search history.

(56) References Cited

U.S. PATENT DOCUMENTS

2020/0222010 A1   7/2020   Howard
2021/0316144 A1   10/2021  Ganguly et al.
2022/0280084 A1*  9/2022   Johnson ................. G16H 20/70

OTHER PUBLICATIONS

Even-Chen, N. et al., "Power-saving design opportunities for wireless intracortical brain-computer interfaces," Nat Biomed Eng, Aug. 2020, DOI: 10.1038/s41551-020-0595-9.

Kao, J. C. et al., "Leveraging neural dynamics to extend functional lifetime of brain-machine interfaces," Scientific Reports, vol. 7, No. 1, Art. No. 1, Aug. 2017.

Kao, J. C. et al., "Single-trial dynamics of motor cortex and their applications to brain-machine interfaces," Nat Commun, vol. 6, No. 1, p. 7759, Nov. 2015, DOI: 10.1038/ncomms8759.

Nason, S. R. et al., "A low-power band of neuronal spiking activity dominated by local single units improves the performance of brain-machine interfaces," Nat Biomed Eng, vol. 4, No. 10, pp. 973-983, Oct. 2020.

Perich, M.G. et al., "Extracellular neural recordings from macaque primary and dorsal premotor motor cortex during a sequential reaching task," CRCNS.org (2018).

Sahasrabuddhe, K. et al., "The Argo: A 65,536 channel recording system for high density neural recording in vivo," bioRxiv, doi: 10.1101/2020.07.17.209403, Jul. 2020.

Salinas, E. et al., "Vector reconstruction from firing rates," J. Comput.Neurosci. 1, 89-107 (1994).

Steinmetz, N. A. et al., "Neuropixels 2.0: A miniaturized high-density probe for stable, long-term brain recording," *Science* 372. 6539 (2021): eabf4588.

Stevenson, I. H. et al., "How advances in neural recording affect data analysis," Nature Neuroscience, vol. 14, No. 2, Art. No. 2, pp. 139-142, Feb. 2011.

Trautmann, E. M. et al., "Accurate Estimation of Neural Population Dynamics without Spike Sorting," Neuron, vol. 103, No. 2, pp. 292-308, Jul. 2019.

Willett, F. R. et al., "High-performance brain-to-text communication via imagined handwriting," bioRxiv, , doi: 10.1101/2020.07. 01.183384, Jul. 2020.

Wolf, P. D., "Thermal Considerations for the Design of an Implanted Cortical Brain-Machine Interface (BMI)," Indwelling Neural Implants: Strategies for Contending with the In Vivo Environment, CRC Press/Taylor and Francis, 2008.

Yu, B. M. et al., "Gaussian-Process Factor Analysis for Low-Dimensional Single-Trial Analysis of Neural Population Activity," Journal of Neurophysiology, vol. 102, No. 1, pp. 614-635, Jul. 2009.

International Search Report and Written Opinion, mailed Feb. 1, 2023, International Patent Application PCT/US2022/078328 filed Oct. 18, 2022, 6 pages.

* cited by examiner

MULTI CHANNEL DATA AGGREGATION BASED DATA COMPRESSION

CROSS-REFERENCE TO RELATED APPLICATIONS

This application is a national stage entry of Patent Cooperation Treaty Application No. PCT/US2022/078328 filed Oct. 18, 2022, entitled "MULTI CHANNEL DATA AGGREGATION BASED DATA COMPRESSION," which claims priority to U.S. Provisional Application No. 63/256,863 filed Oct. 18, 2021, entitled "UNSUPERVISED CHANNEL COMPRESSION METHODS IN MOTOR PROSTHESES". The disclosures of which are incorporated herein by reference in their entirety.

TECHNICAL FIELD

This application relates generally to energy efficient aggregation, compression, and extraction of data associated with neural activity data.

BACKGROUND

Brain machine interfaces assist individuals suffering from impairments in performing various tasks. These interfaces operate to detect and map signals specific to various portions of a patient's brain in order to determine an action that an individual intended to perform and facilitate performance of the action, e.g., picking up a cup, moving a chair, interacting with a keyboard and mouse, and so forth. These interfaces may be communicatively coupled to a robotic arm that performs a patient intended action. However, increasing the precision with which a patient's intended action is identified and performed involves mapping the patient's brain signals with higher accuracy, which in turn involves embedding a large number of sensors on the brain, e.g., to detect brain activity across a wide area of the brain. Operation of a large number of sensors results in a disproportionate amount of heat generation and power consumption, which may adversely affect the brain's condition, e.g., burn brain tissue.

SUMMARY

In some embodiments, there may be provided a system for data compression. The system comprises at least one computer that is communicatively coupled with at least one sensor: the at least one sensor is embedded in a brain and configured to: detect a plurality of activity data associated with neurons of the brain; implement a compression algorithm on the plurality of activity data, the implementing including: comparing a first entropy value associated with a first set of data points of the plurality of activity data with a second entropy value associated with a second set of data points of the plurality of activity data; and combining the first set of data points responsive to determining that the first entropy value is lower than the second entropy value; and transmit the combination of the first set of data points to the at least one computer. The at least one sensor is a neural implant that is embedded in the brain and the at least one sensor includes a probe, a processor including at least a multiplexer, and a battery. The probe of the at least one sensor is configured to detect the plurality of activity data associated with the neurons.

The combining of the first set of data points by the at least one sensor includes the at least one sensor routing a first neural activity data of the plurality of activity data corresponding to a first set of neurons to a first input of the multiplexer and a second neural activity data corresponding to a second set of neurons of the plurality of activity data to a second input of the multiplexer; and aggregating the first neural activity data routed to the first input of the multiplexer and the second neural activity data routed to the second input of the multiplexer. Further, the combining of the first set of data points by the at least one sensor further includes the at least one sensor generating, via a first output of the multiplexer, a first compressed data output that includes the first neural activity data and the second neural activity data. The implementation of the compression algorithm by the at least one sensor includes the at least one sensor: comparing a third entropy value associated with a third set of data points of the plurality of activity data with a fourth entropy value associated with a fourth set of data points of the plurality of activity data; and combining the third set of data points responsive to determining that the third entropy value is lower than the fourth entropy value. Further, the combining of the third set of data points by the at least one sensor includes the at least one sensor: routing a third neural activity data of the plurality of activity data corresponding to a third set of neurons to a third input of the multiplexer and a fourth neural activity data corresponding to a fourth set of neurons of the plurality of activity data to a fourth input of the multiplexer; and aggregating the third neural activity data routed to the third input of the multiplexer and the fourth neural activity data routed to the fourth input of the multiplexer. Further, the combining of the third set of data points by the at least one sensor further includes the at least one sensor generating, via a second output of the multiplexer, a second compressed data output that includes the third neural activity data and the fourth neural activity data.

The implementation of the compression algorithm by the at least one sensor includes the at least one sensor configured to determine trajectories of latent variables associated with the first set of data points and the second set of data points. The determination of the trajectories of the latent variables is based on Gaussian Process Factor Analysis. Further, the at least one computer is external to the brain and configured to wirelessly communicate with the at least one sensor. Alternatively or additionally, the at least one computer is configured to communicate with the at least one sensor via a wired connection.

In some embodiments, there may be provided a method for data compression. The method comprises detecting, in real time, a plurality of activity data associated with neurons of a brain using a plurality of channels included as part of at least one device, implementing, automatically and without user intervention, a compression algorithm in association with the plurality of channels, determining at least one of the plurality of channels responsive to the implementation of the compression algorithm, extracting a segment of the plurality of activity data that is specific to at least one of the plurality of channels, and transmitting the segment to a computer.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

As noted above, brain machine interfaces operate to assist patients suffering from an impairment to perform an intended action, e.g., pick up a cup, move a chair, and so forth. In operation, brain machine interfaces detect signals from various areas of a patient's brain, map these signals to a specific action the patient intended to perform, and subsequently control the movement of, e.g., an autonomous device, a robotic arm, and so forth, in accordance with the specific action. However, to maintain and improve the accuracy with which these interfaces identify and manage the performing of an intended action, a large number of sensors may need to be embedded in the brain, in particular, positioned directly on a number of signal recording locations on the patient's brain tissue. During operation of these sensors, a significant amount of heat may be generated and a large amount of energy or power may be consumed, causing an increase in the temperature of these sensors, which in turn increases the temperature of the brain. Such an increase can result in adverse consequences, e.g., damaging brain tissue.

In some embodiments, the system as described in the present disclosure addresses and overcomes this deficiency. In an example operation, an sensor may be embedded in a brain of a patient and operate to detect and obtain neural activity data associated with a large number of neurons. Neural activity may correspond to spikes or sudden excitations or changes in electric impulses across various portions of the brain. The sensor that is embedded in the brain may include a probe that extends from a processor (e.g., included as part of an integrated circuit or chip) and operate to capture the neural activity. The probe may then route the captured neural activity data to a plurality of input channels associated with the processor. In embodiments, the input channels correspond to the inputs of, e.g., a multiplexer, a signal adder, or another comparable component, that is positioned on the processor.

For example, neural activity data associated with a first set of neurons may be routed to a first input of the multiplexer, neural activity associated with a second set of neurons may be routed to a second input of the multiplexer, and neural activity associated with a third set of neurons may be routed to a third input of the multiplexer. Thereafter, the processor, utilizing the multiplexer, may implement a compression algorithm on the data associated with the first input (corresponding to a first channel) of the multiplexer, the second input (corresponding to a second channel) of the multiplexer, and the third input (corresponding to a third channel) of the multiplexer. For example, the compression algorithm may determine that an increase in conditional entropy upon combining data associated with the first and second inputs of the multiplexer is less than an increase in conditional entropy upon combining data associated with the first and third inputs of the multiplexer. Based on this determination, the processor may combine or aggregate data of the first and second inputs, as such a combination results in the least amount of increase in conditional entropy. Further, implementation of the compression algorithm may also ensure that the majority of neural activity is maintained subsequent to the combination of the first and second input, including the majority of data routed to the third input. The aggregation of the data routed to the first and second inputs is transmitted from a particular output of the multiplexer, which corresponds to the output channels as described in the present disclosure. It is noted that components comparable to the multiplexer, such as an signal adder, may also be utilized and operate to perform the same functions as the multiplexer. Other components comparable to a multiplexer and signal adder are also contemplated.

In this way, the data compression system of the present disclosure enables for the maintaining of a threshold level of accuracy with which neural activity is captured by the sensors and transmitted by sensors to one or more computers outside of the brain, while simultaneously ensuring that data loss from combining data from the inputs of the multiplexer (e.g., input channels) is also maintained below a threshold level. It is noted that a number of multiplexers may be installed as part of the processor and each multiplexer may include a plurality of input channels and a plurality of corresponding output channels. Additionally, as stated above, it is noted that other components comparable to the multiplexer may also be installed on the processor, e.g., one or more signal adders and/or components comparable to the multiplexer, signal adder, and so forth.

Figure 1:
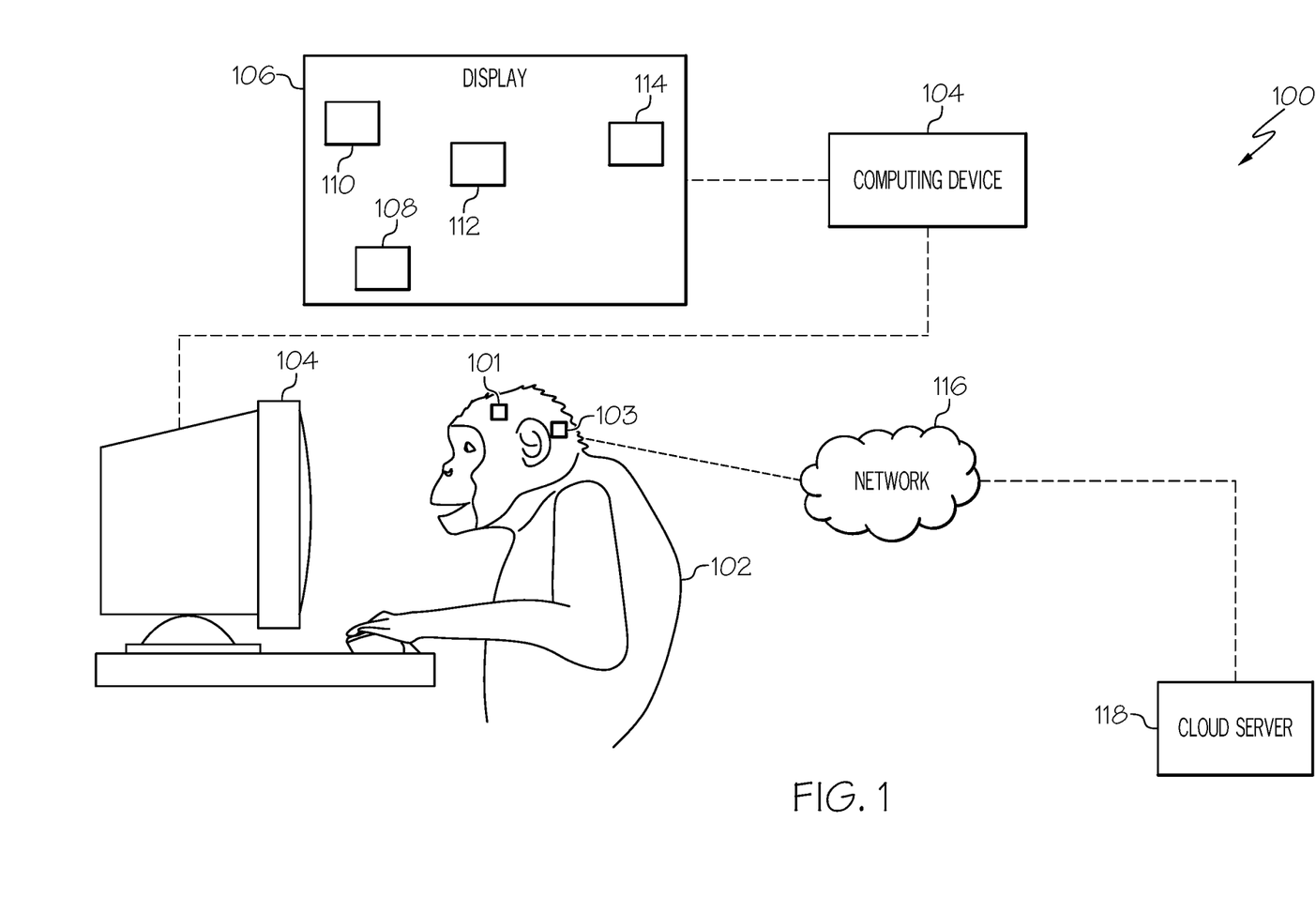
FIG. 1 depicts training a machine learning model to implement a data compression algorithm as described in the present disclosure, according to some embodiments.

FIG. 1 depicts training a machine learning model to implement a compression algorithm as described in the present disclosure, according to some embodiments. In some embodiments, sensors 101 and 103 may be embedded in the brain of a test subject 102. The sensors 101 and 103 may be communicatively coupled to the computing device 104 such that the sensors 101 and 103 communicate wirelessly with the computing device 104 and/or communicate with the computing device 104 via a wired connection. Further, the sensors 101 and 103 may also communicate via a wired medium with the cloud server 118 or wirelessly with the cloud server 118, e.g., via the network 116.

In embodiments, each of the sensors 101 and 103 may include probes that extends from portion of sensors 101 and 103, a processor, and a battery. The processor may be an integrated circuit or chip that includes a plurality of multiplexers. It is noted that components comparable to the multiplexers may also be included as part of the processor such as, e.g., signal adders, and other such comparable components. Further, the sensors 101 and 103, utilizing the probes, may detect neural activity over various portions of the brain. Thereafter, these probes may route the captured neural activity data to respective inputs of multiplexers of the sensors 101 and 103. Then, a trained machine learning model, operating independently on each of the sensors 101 and 103 or implemented by the sensors 101 and 103 in conjunction with the computing device 104 that is external to the sensors 101 and 103 may implement the compression algorithm, namely on the data routed to the inputs of the multiplexers. The processors of the sensors 101 and 103 may implement the compression algorithm such that data routed to two of the inputs of a multiplexer may be combined or aggregated (i.e. compressed) and routed to an output of the multiplexer based on, e.g., analysis of variation in conditional entropy. Thereafter, the output of the multiplexer—the aggregated data from two of the inputs—may be transmitted to the cloud server 118 via the network 116. It is noted that the inputs of the multiplexers corresponds to input channels, as described in the present disclosure, and the outputs of the multiplexers correspond to output channels, as described in the present disclosure. It is further noted that the input channels and output channels as described above may also correspond to inputs and outputs of various devices that are comparable to a multiplexer such as, e.g., a signal adder. Other components are also contemplated.

Having described the implementation of the compression algorithm by the trained machine learning model, a description of training of the machine learning in instructive. FIG. 1 illustrates an example interaction of the test subject 102 with a computing device 104. In particular, the test subject 102 may be viewing various graphical representations 108, 110, 112, and 114, which are output on the display 106. The graphical representations 108, 110, 112, and 114 may be output on the display 106 at particular times and at random locations and the test subject 102 may select one or more of these graphical representations 108, 110, 112, and 114. The movement of, e.g., an arm of the test subject 102, during the selection may be associated with corresponding neural activity detected by the sensors 101 and 103, and as such, neural activity of particular portions of the brain may be mapped to specific physical movements. In embodiments, a large set of simple and complex movements performed by the test subject 102 may be tracked by the sensors 101 and 103, which may map neural activity with specific physical movements. All of the data associated with the neural activity may be incorporated as part of a dataset, which may be utilized as a training and testing dataset for training and testing a machine learning model for implementing a compression algorithm as described in the present disclosure. Broadly speaking, prior to the implementation of the compression algorithm, as stated above, neural activity data (e.g., spike count of neurons), which represents a sharp excitation in electrical potential during a particular time frame may be routed to the processor via the probe, namely to the inputs of the multiplexers on the sensors 101 and 103.

As part of the training testing of the machine learning model, a description of the steps for implementation of the compression algorithm are instructive. In some embodiments, spike counts, which are representative of excitation in electrical potential of neurons, which are obtained by the probe of the sensors 101 and 103, may be defined according to the following equation:

$$Y \in R^{N \times T} \quad (1)$$

In the above equation, the term "N" is a number of initial sorted neurons and the term "T" is a number of time-points within the dataset. Further, the equation $Y_D \in \mathfrak{R}^{D \times T}$ may be defined as a compressed feature set with the term "D" representing a particular number of outputs associated with the multiplexer (i.e. output channels) after compression. Further, a matrix "M" may be defined such according to the following equation:

$$Y_D = M * Y \quad (2)$$

The determination of the matrix "M" involves the compression of a dataset by combining data routed to inputs of multiplexers (i.e., input channels), which correspond to spikes (e.g., neural activity) at various locations of the brain. It is noted that, subsequent to the implementation of the compression algorithm, the data representative of the neural activity that is captured by the spike count of all of the neurons are maintained while the number of outputs from the multiplexer (corresponding to output channels defined by the term "D") that are utilized to extract and transmit the data to an external device (e.g., the cloud server 118) are reduced. It is noted that the matrix "M" may be in binary form, and data associated with various neurons are mapped to multiple inputs (e.g., input channels) of the multiplexers are combined and output by smaller number of outputs of the multiplexer (e.g., output channels).

As part of the implementation of the compression algorithm, the number of input channels may be reduced in an iterative manner, such that at a first iteration, data from a first subset of the input channels are combined, and at a second iteration, data from a second subset of input channels are combined together, and as such, data from at least a pair of channels are combined at every iteration in order to reduce the channel count by a factor of 1. The criteria for combining data from the channels vary based on compression algorithm or methodology utilized. Regarding the channel compression algorithm or methodology, it is noted that a set of lower-dimensional latent variables describe the activities of a high dimensional set of neurons.

It is noted that, after generation of the matrix "M", trajectories specific to the latent variables representative of the high dimensional set of neurons may be determined. In embodiments, the data compression system described in the present disclosure may utilize GPFA to estimate the trajectories associated with the latent variables. GPFA is a generative probabilistic model that unifies temporal smoothing and dimensionality reduction parameters in order to extract latent variable trajectories that describe variability in the activity of the high dimensional set of neurons. The latent variables in GPFA are defined according to the equation: $Z \in \mathfrak{R}^{Q \times T}$, in which the term Q is less than the term N. As such, the relationship between the observations and the latent variable at time $t \in T$ is defined by the following equation:

$$y_t^i \mid z_t^i \sim \mathcal{N}(C z_t^i + \mu, R) \quad (3)$$

However, it is noted that GPFA is just one example technique of determining trajectories of latent variables and that one or more of a plurality of other techniques may also utilized to determine trajectories of the latent variables. In the above equation, the term "z" represents all the latent variables at a timepoint t. Further, a factor loading matrix is represented by $C \in \mathfrak{R}^{N \times Q}$, the mean value of the neural observations is represented by the term $\mu \in \mathfrak{R}^{N \times 1}$, and covariance is represented by the term $R \in \mathfrak{R}^{N \times N}$. It is noted that latent variables are correlated through a Gaussian process that is represented by the equation $z_i \sim \mathcal{N}(0, K_i)$, in which the term $K_i \in \mathfrak{R}^{T \times T}$ is the covariance matrix of the ith Gaussian process. In addition, smoothing properties may be determined by the choice of the form of the GP covariance and neural states may be inferred using the following equation:

$$E[\bar{z} \mid \bar{y}] = \overline{KC}'(\overline{CKC}' + \overline{R})^{-1} * (\bar{y} - \bar{\mu}) \qquad (4)$$

In the above equation, the terms $\bar{y}$ and $\bar{z}$ are associated with concatenations of features of observations of neurons and neural states across various time periods. The terms $\overline{C}$ and $\overline{R}$ are the time blocks of variables C and R, and $\overline{K}$ may be composed of Q sub-matrices such that each sub-matrix is associated with the covariance between two time points in a particular neural state "i". Using GPFA, a low dimensional trajectory of the latent variables may be determined, in association with a particular time period, based on the uncompressed dataset Y, which represents the uncompressed data set of spike counts associated with a neuron population, and the term $Y_D$, which represents the compressed dataset. Further, GPFA parameters may be determined from the original uncompressed data set Y and the matrix M may be applied to the determined parameters in order to determine the parameters of the reduced dataset $Y_D$ using the following equation:

$$y = Cz + \mu + \epsilon \rightarrow y_D = My = MCz + M\mu + M\epsilon \qquad (5)$$

As stated above, it is noted that GPFA is just one example technique of determining trajectories of latent variables and that one or more of a plurality of other techniques may also utilized to determine trajectories of the latent variables. The parameters of the GPFA model associated with the reduced dataset $Y_D$ may be represented by the following terms: $C_D = M_c$ and $\mu_D = M_\mu$. In addition, it is noted that the matrix M compresses neural observations while the latent space is maintained (e.g., not changed).

It is noted that, subsequent to the determination of the trajectories of the latent variables, the precision with which the latent variables represent the high dimensional set of neurons, namely the neural activity associated with the original uncompressed channel, e.g., inputs to the multiplexer. In one example, a prediction error based technique may be utilized, which may estimate the activity of a particular neuron associated with the latent variables that is determined using a number of other neurons in a particular data set. For example, the particular neuron may be removed from a dataset and the remaining neurons may be utilized to determine the activity of the removed neuron. A prediction error may be computed by measuring a sum of squared errors between the original neuron and its prediction.

In another example, a kinematic reconstruction based technique may be utilized to determine how effectively a low dimensional latent variable represents the behavior of a high dimensional set of neurons with the use of optimal linear estimators. In particular, optimal linear estimations may be utilized to build a linear relationship between the behavior of the trajectories of the latent variables.

A number of compression algorithms or methods may be utilized to reduce the number of channels while maintaining, extracting, and transmitting neural activity data specific to all neurons in a particular neuron population. For example, a private noise based compression algorithm may be utilized in which a subset of input channels (e.g., inputs of a multiplexer, signal adder, or other comparable components) associated with the neurons that exhibit a particular threshold level of private noise are combined or aggregated and only data associated with the combined channel (e.g., outputs of the multiplexer, signal adder, or other comparable components) is transmitted to an external device (e.g., cloud server 118). As such, heat generation and noise associated with transmission of data associated with multiple output channels is reduced, while the data associated with each output channel of the subset of output channels is maintained. In another example, a conditional entropy based compression method may be utilized. Entropy measures a level of uncertainty in a random variable, and as such, conditional entropy is utilized to evaluate how much of an entropy associated with a latent variable (a low dimensional latent variable that serves to represent the neural activity of a subset of a high dimensional population of neurons) is altered by a particular compression algorithm utilized to combine data from various input channels (e.g., inputs of the multiplexer, signal adder, or other comparable components). Regarding the conditional entropy based compression method, conditional entropy of a latent variable is measured using the following equation:

$$H(Z \mid Y) = H(Z, Y) - H(Y) \qquad (6)$$

Using the above equation, the algorithm determines a pair to channels for combining that results in an increase in a conditional entropy value that is the least of a plurality of input channels that may potentially be combined. Further, some input channels include additional or excess data as opposed to other input channels. The input channels that include excess or additional data are not selected as candidates for combining. The process of selecting a combination of input channels that results in a least amount of increase in conditional entropy relative to a plurality of other channels may be performed a number of times iteratively.

Figure 2:
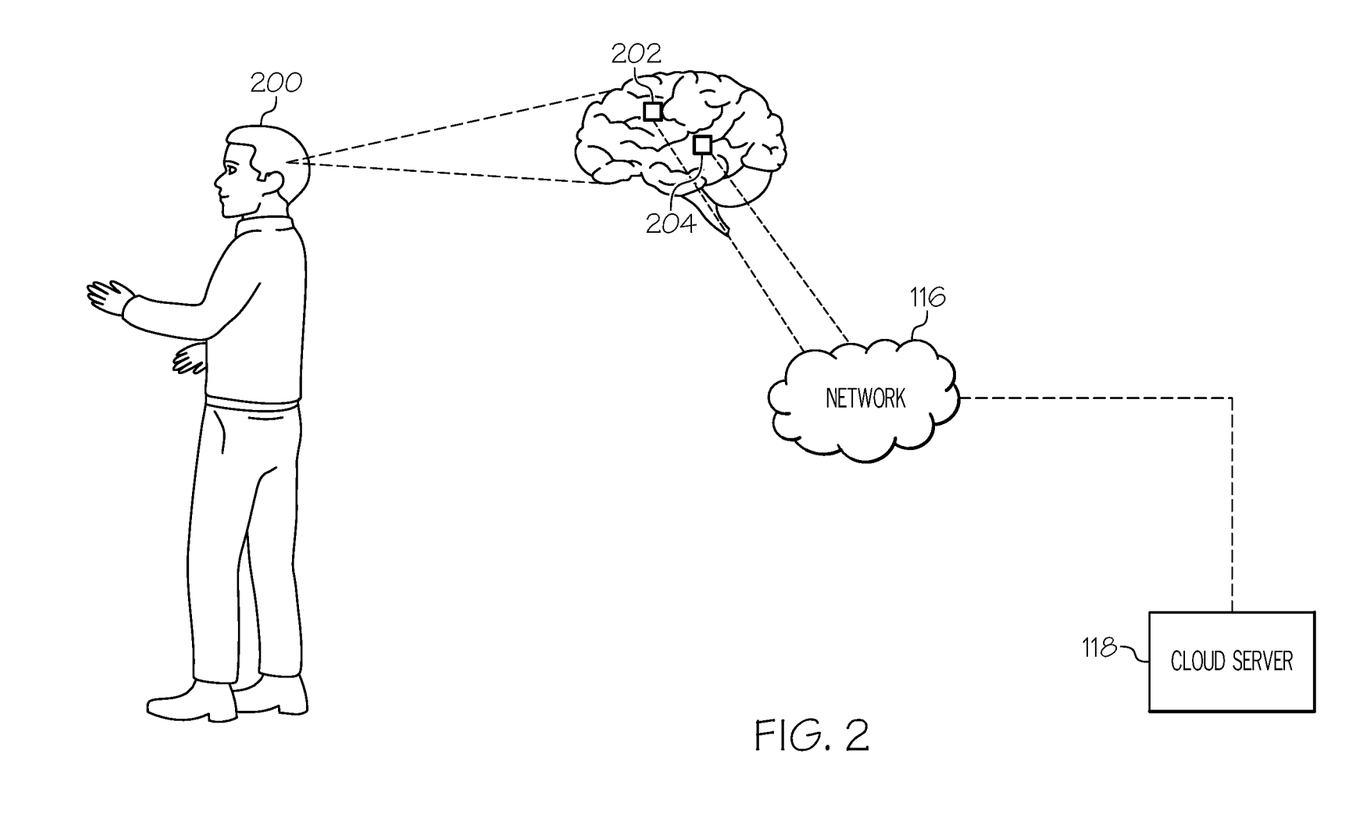
FIG. 2 illustrates an example implementation of the data compression algorithm of the present disclosure using a trained machine learning model, in accordance with some example embodiments.

FIG. 2 illustrates an example implementation of the data compression algorithm of the present disclosure using a trained machine learning model, in accordance with some example embodiments. In particular, FIG. 2 illustrates example sensors 202 and 204 that are embedded in or disposed directly on the brain tissue of an individual 200. In some embodiments, these example sensors 202 and 204 detect neural activity and are associated with various channels, each of which are utilized to determine spikes in neural activity. Further, using one of the compression methods described above (e.g., conditional entropy based compression method), input channels may be iteratively combined based on a particular criterion, namely variation in uncertainty of a set of latent variables that represent the neural activity of a larger set of high dimensional neurons. After multiple input channel combining operations are performed, the data associated with the combined channels may be transmitted by the example sensors 202 and 204, via the network 116 (e.g., communication network) to an external device in the form of the cloud server 118. It is noted that the transmission the data associated with the combined channels may be performed wirelessly or via a wired medium. It is noted that the implementation of the compression algorithm may involve the use of the trained machine learning model.

It is noted that such a compression algorithm may be utilized to enable the individual 200 to perform an intended action with the use of, e.g., a robotic arm, while simultaneously reducing the likelihood of damage to the individual's brain that may be caused by temperature increase in the example sensors 202 and 204, e.g., as part of the operation and transmission of neural activity data to one or more outside the brain of the individual 200. For example, the individual 200 may be handicapped (e.g., lacking an arm), and as such, a robotic arm may be surgically attached to the individual 200. In operation, the individual may attempt to pick up a cup on a table by performing a particular attempted action. The example sensors 202 and 204 may detect spikes in neurons which may then be mapped to a particular intended action. As such, upon detecting a spike or a sharp excitation in electrical potential caused by neuron activity, the example sensors 202 and 204 may implement the compression algorithm, as a result of which input channels to which data of the spikes representing the neural activity are routed, may be combined in accordance with various criteria described above. For example, if a conditional entropy based compression algorithm is implemented, data routed to input channels (e.g., inputs to the multiplexer, signal adder, or other comparable components) that cause a least amount of increase in entropy may be aggregated or combined, and combined data from the outputs of the multiplexer (e.g., output channel) may be transmitted directly to a computing device on the robotic arm. In some embodiments, the combined data may be routed to the robotic arm via the cloud server 118. For example, a conditional entropy increase corresponding to a possible combination of data from a first set of input channels may result in a first conditional entropy value and a conditional entropy increase corresponding to data associated with a second set of channels may result in a second conditional entropy value. Further, if the first conditional entropy value is lower than the second conditional entropy value, the first set of channels may be combined as a result of the implementation of the compression algorithm.

It is noted that, the combining of the data from various input channels (e.g., based on conditional entropy variation), as a result of the implementation of the compression algorithm, reduces the operating power of the example sensors 202 and 204, as only a subset of the channel data may need to be transmitted to an external device. In this way, the amount of heat generated by the example sensors 202 and 204 during operation is reduced, which in turn reduces the adverse effects that the heated example sensors 202 and 204 may have on the brain tissue of the individual 200.

Figure 3:
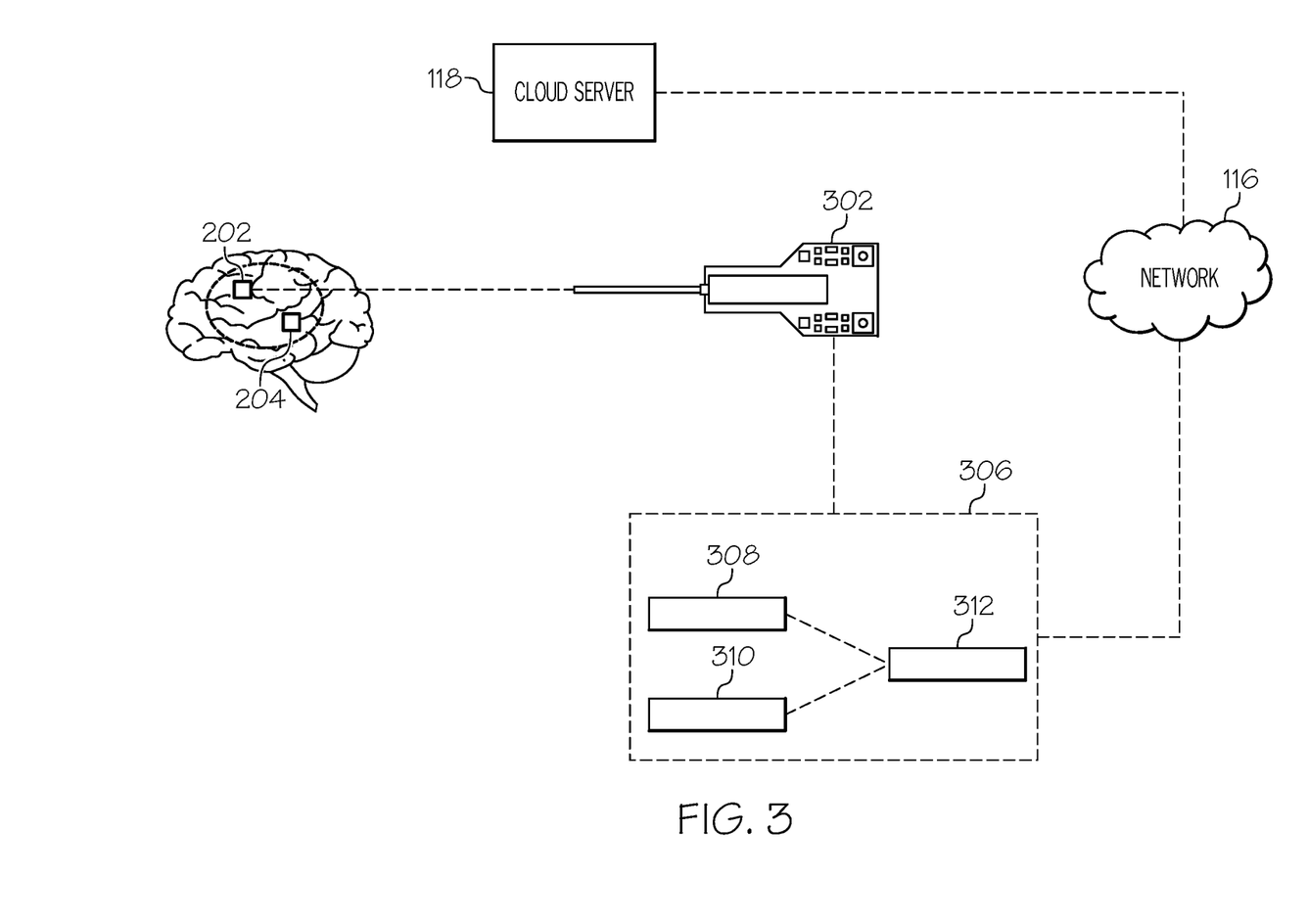
FIG. 3 illustrates an example design of the example sensor and the implementation of one of the data compression algorithms of the present disclosure, in accordance with some example embodiments.

FIG. 3 illustrates an example design 302 of the example sensor 202 and the implementation of one of the data compression algorithms of the present disclosure, in accordance with some example embodiments. In particular, FIG. 3 illustrates an example design 302 of the example sensor 202 that may be embedded in the brain of the individual 200. The example design 302 may include a microprocessor, a transistor, a miniature battery (or comparable power sources), and a probe that may contact a portion of the brain. In some embodiments, the example design 302 of the example sensor 202 may implement the conditional entropy based compression algorithm. The example sensor 202 may determine that combining neural activity data routed to input channels 308 and 310 associated with a multiplexer and outputting the combined or aggregated data to an output channel 312 may result in a least amount of increase in conditional entropy. For example, aggregating data from input channels 308 and 310 of the multiplexer may result in a conditional entropy value that is less than aggregating data from other input channels of the multiplexer. For these reasons, data routed to input channels 308 and 310 (e.g., inputs of the multiplexer, signal adder, or other comparable components) may be aggregated as opposed to data routed to other input channels (e.g., other inputs of the multiplexer, signal adder, or other comparable components).

Figure 4:
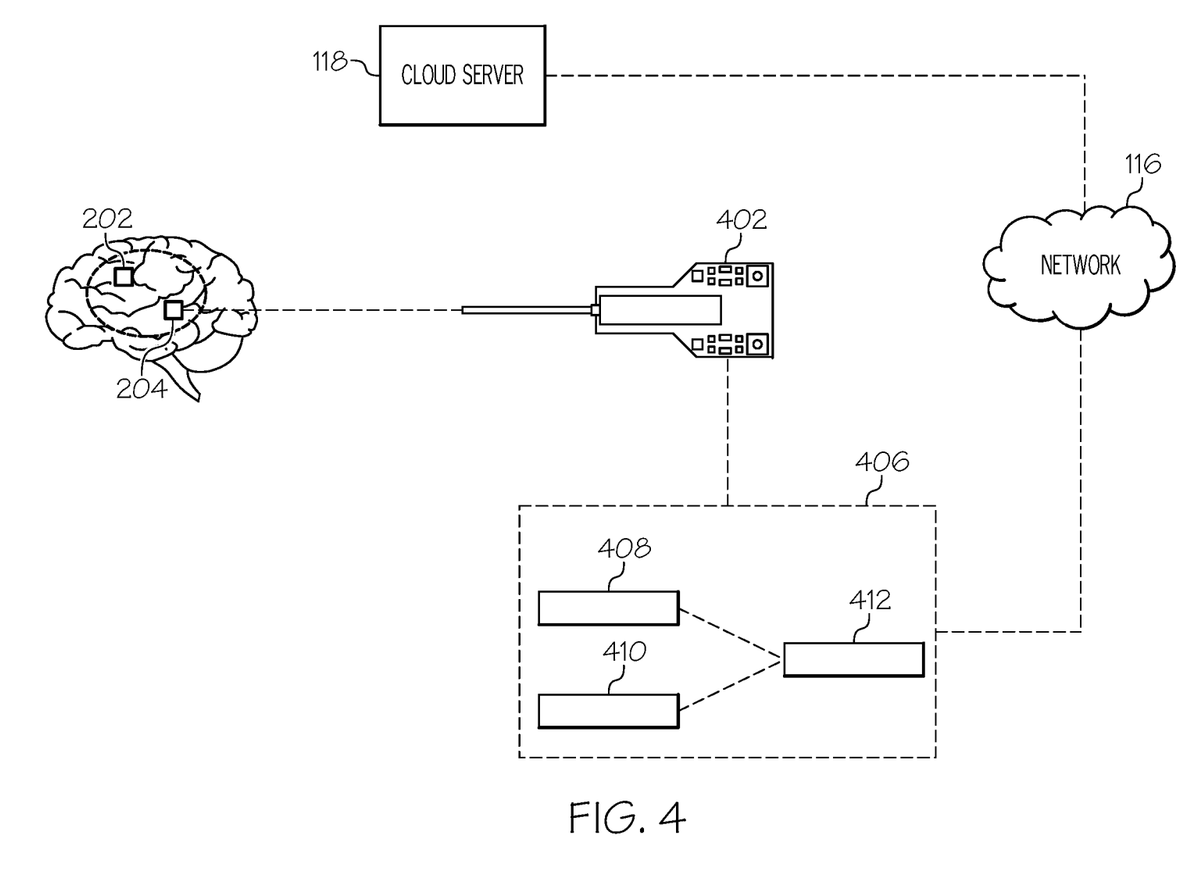
FIG. 4 illustrates an example design of the example sensor and the implementation of one of the data compression algorithms of the present disclosure, in accordance with some example embodiments.

FIG. 4 illustrates an example design 402 of the example sensor 204 and the implementation of one of the data compression algorithms of the present disclosure, in accordance with some example embodiments. In particular, FIG. 4 illustrates an example design 402 of the example sensor 204 that may also be embedded in the brain of the individual 200. Similar to the example design 302, the example design 402 may include a microprocessor, a transistor, a miniature battery (or comparable power sources), and a probe that may contact a portion of the brain. In some embodiments, the example design 402 may include a miniature battery with reduced or altered power requirements as compared to the example design 302. In some embodiments, the example design 402 of the example sensor 204 may implement the private noise based compression algorithm. As a result, the example sensor 204 may determine that combining neural activity data routed to input channels 408 and 410 of a multiplexer and outputting the combined or aggregated data to an output channel 412 may result in a least amount of increase in conditional entropy. For these reasons, data routed to input channels 408 and 410 (e.g., inputs of the multiplexer, signal adder, or other comparable components) may be aggregated as opposed to data routed to other input channels (e.g., other inputs of the multiplexer, signal adder, or other comparable components).

Figure 5:
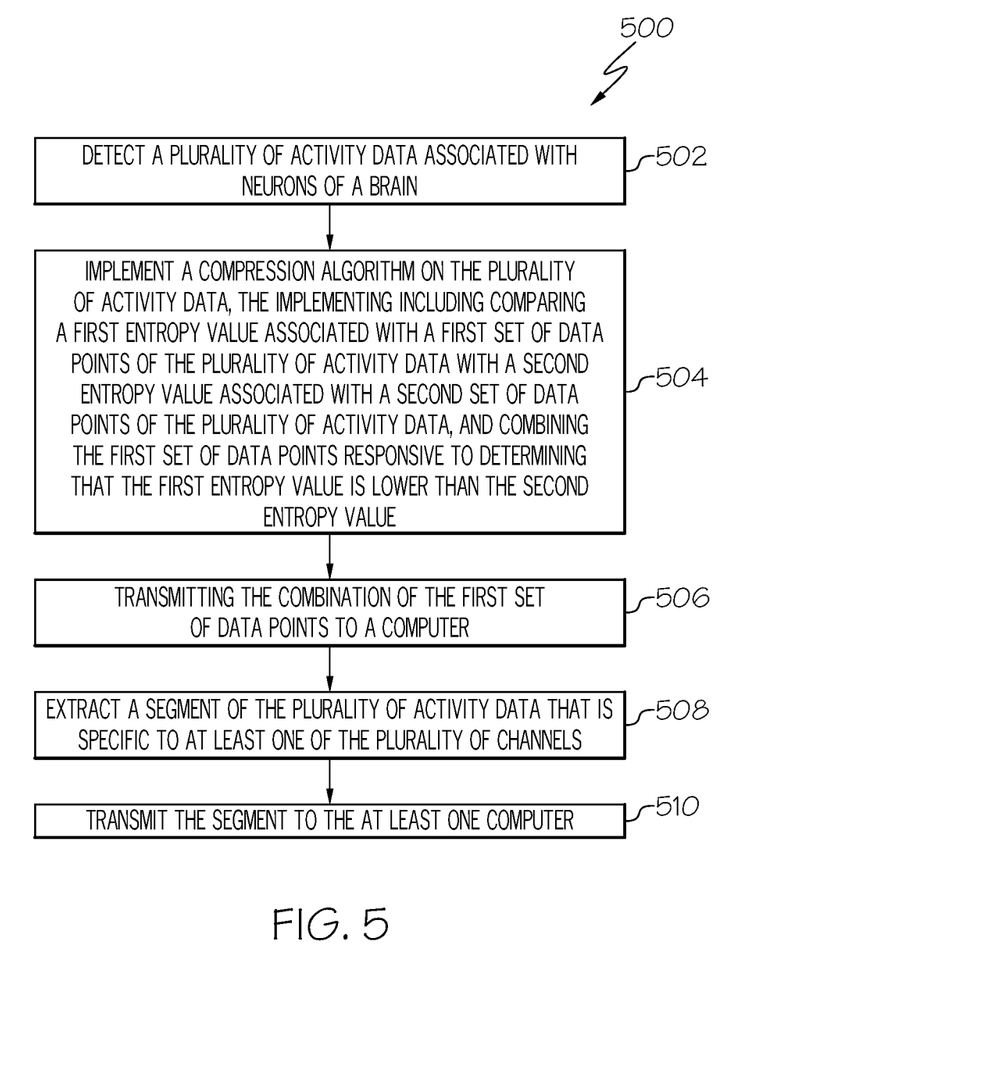
FIG. 5 depicts a flow diagram of steps for implementing the data compression algorithm of the present disclosure, in accordance with some embodiments.

FIG. 5 depicts a flow diagram of steps for implementing the data compression algorithm of the present disclosure, in accordance with some embodiments. In particular, in block 502, a plurality of activity data associated with neurons of the brain may be detected. For example, as stated above, neural activity data may be obtained via probes included in sensors that are embedded in the brain of an individual.

In block 504, a compression algorithm may be implemented on the plurality of data. The implementation may include comparing a first entropy value associated with a first set of data points of the plurality of activity data with a second entropy value associated with a second set of data points of the plurality of activity data, and combining the first set of data points responsive to determining that the first entropy value is lower than the second entropy value. As described above, data routed to a set of inputs of the multiplexer (e.g., input channels) included as part of the processor of a sensor embedded in the brain that causes a least amount of increase in conditional entropy, e.g., relative to at least another set of input inputs of the multiplexer (e.g. input channels), may be combined, e.g., based on the implementation of the compression algorithm.

In block 506, the combination of the first set of data points may be transmitted to a computer. For example, the combined data as described in block 504 may be output from an output of a multiplexer (e.g., output channel) and transmitted from the output of the multiplexer to one or more computers external to the sensors embedded in the brain.

Figure 6:
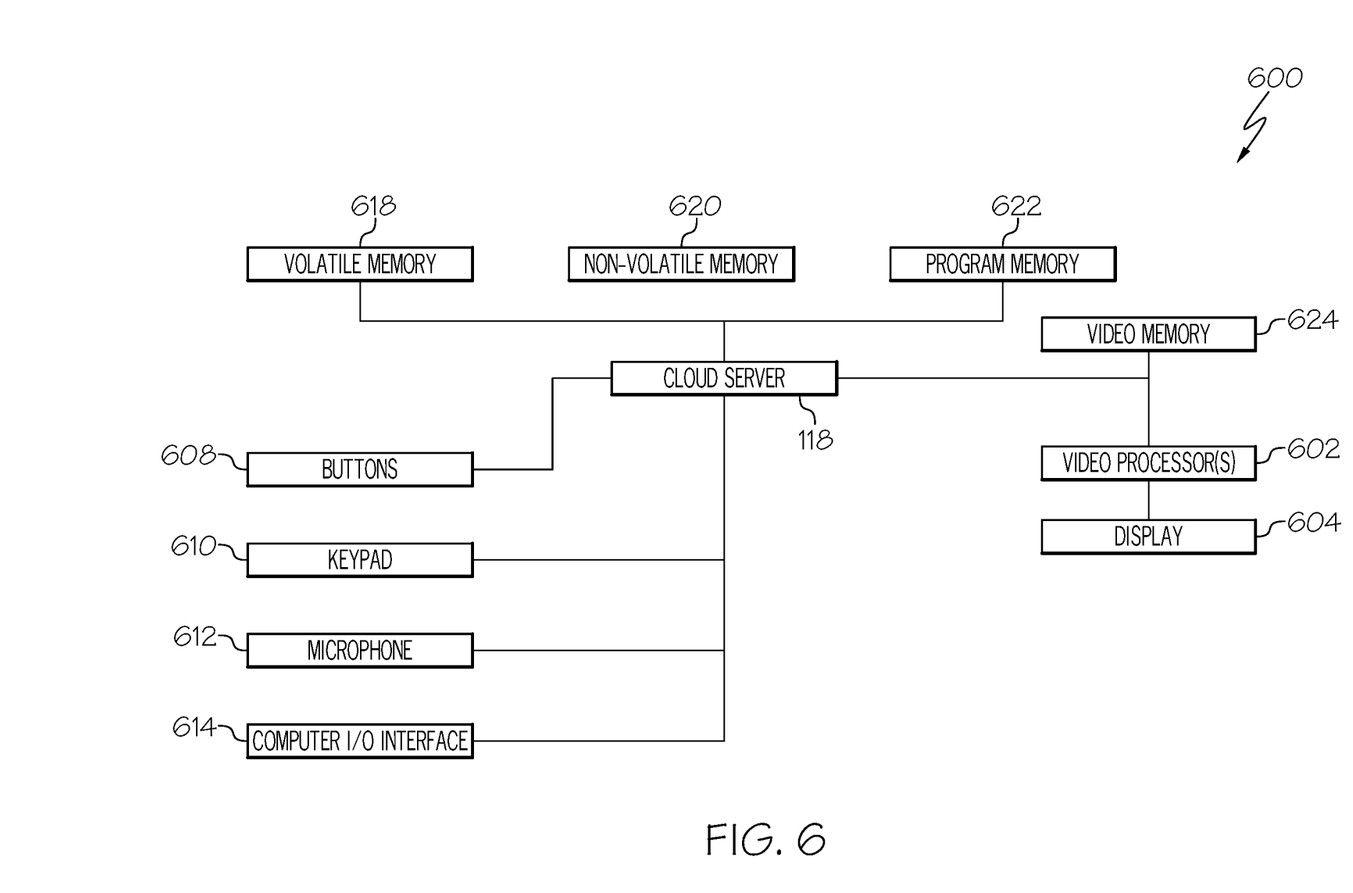
FIG. 6 depicts a computing system that may implement one or more of the data compression algorithms of the present disclosure, in accordance with some embodiments.

FIG. 6 depicts a computing system 600 that may implement one or more of the compression algorithms of the present disclosure, in accordance with some embodiments. The computing system may include a cloud server 118 that is communicatively coupled (wired or wirelessly coupled) to a display 604, a keypad 610 (e.g., a keyboard) one or more sensors implanted in the brain of a patient, and one or more brain machine interfaces that are external to the cloud server 118. The cloud server 118 may also include video processors 602, buttons 608, a microphone 612, a computer input/output interface 614, memory in the form of volatile memory 618, non-volatile memory 620, and program memory 622.

The video processor 602 can provide/receive commands, status information, streaming video, still video images, and graphical overlays to/from the cloud server 118 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The cloud server 118 can be used to manage the user interface by receiving input via buttons 608, keypad 610, and/or microphone 612, in addition to providing a host of other functions, including image, video, and audio storage and recall functions, system control, and measurement processing. The buttons 608 and/or keypad 610 also can be used for menu selection and providing user commands to the cloud server 118 (e.g., freezing or saving a still image). The microphone 612 can be used by the inspector to provide voice instructions to freeze or save a still image.

The video processor 602 can also communicate with video memory 624, which is used by the video processor 602 for frame buffering and temporary holding of data during processing. The cloud server 118 can also communicate with program memory 622 for storage of programs executed by the cloud server 118. In addition, the cloud server 118 can be in communication with the volatile memory 618 (e.g., RAM), and the non-volatile memory 620 (e.g., flash memory device, a hard drive, a DVD, or an EPROM memory device). The non-volatile memory 620 is the primary storage for streaming video and still images.

The cloud server 118 can also be in communication with a computer input/output interface 614, which provides various interfaces to peripheral devices and networks, such as USB, Firewire, Ethernet, audio I/O, and wireless transceivers. This computer input/output interface 614 can be used to save, recall, transmit, and/or receive still images, streaming video, or audio. For example, a USB "thumb drive" or CompactFlash memory card can be plugged into computer input/output interface 614. In addition, the computing system 600 can be configured to send frames of image data or streaming video data to an external computer or server. The computing system 600 can incorporate a TCP/IP communication protocol suite and can be incorporated in a wide area network including a plurality of local and remote computers, each of the computers also incorporating a TCP/IP communication protocol suite.

It will be understood that, while certain components have been shown as a single component (e.g., the cloud server 118) in FIG. 1, multiple separate components can be used to perform the functions of the cloud server 118.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprises at least one computer that is communicatively coupled with at least one sensor: the at least one sensor is embedded in a brain and configured to: detect a plurality of activity data associated with neurons of the brain; implement a compression algorithm on the plurality of activity data, the implementing including: comparing a first entropy value associated with a first set of data points of the plurality of activity data with a second entropy value associated with a second set of data points of the plurality of activity data; and combining the first set of data points responsive to determining that the first entropy value is lower than the second entropy value; and transmit the combination of the first set of data points to the at least one computer.

Example 2: The system of Example 1, wherein the at least one sensor is a neural implant that is embedded in the brain.

Example 3: The system of Example 1 or Example 2, wherein the at least one sensor includes a probe, a processor including at least a multiplexer, and a battery.

Example 4: The system of any of Examples 1-3, wherein the probe of the at least one sensor is configured to detect the plurality of activity data associated with the neurons.

Example 5: The system of any of Examples 1-4, wherein the combining of the first set of data points by the at least one sensor includes the at least one sensor: routing a first neural activity data of the plurality of activity data corresponding to a first set of neurons to a first input of the multiplexer and a second neural activity data corresponding to a second set of neurons of the plurality of activity data to a second input of the multiplexer; and aggregating the first neural activity data routed to the first input of the multiplexer and the second neural activity data routed to the second input of the multiplexer.

Example 6: The system of any of Examples 1-5, wherein the combining of the first set of data points by the at least one sensor further includes the at least one sensor generating, via a first output of the multiplexer, a first compressed data output that includes the first neural activity data and the second neural activity data.

Example 7: The system of any of Examples 1-6, wherein the implementation of the compression algorithm by the at least one sensor includes the at least one sensor: comparing a third entropy value associated with a third set of data points of the plurality of activity data with a fourth entropy value associated with a fourth set of data points of the plurality of activity data; and combining the third set of data points responsive to determining that the third entropy value is lower than the fourth entropy value.

Example 8: The system of any of Examples 1-7, routing a third neural activity data of the plurality of activity data corresponding to a third set of neurons to a third input of the multiplexer and a fourth neural activity data corresponding to a fourth set of neurons of the plurality of activity data to a fourth input of the multiplexer; and aggregating the third neural activity data routed to the third input of the multiplexer and the fourth neural activity data routed to the fourth input of the multiplexer.

Example 9: The system of any of Examples 1-8, wherein the combining of the third set of data points by the at least one sensor further includes the at least one sensor generating, via a second output of the multiplexer, a second compressed data output that includes the third neural activity data and the fourth neural activity data.

Example 10: The system of any of Examples 1-9, wherein the implementation of the compression algorithm by the at least one sensor includes the at least one sensor configured to determine trajectories of latent variables associated with the first set of data points and the second set of data points.

Example 11: The system of any of Examples 1-10, wherein the determination of the trajectories of the latent variables is based on Gaussian Process Factor Analysis.

Example 12: The system of any of Examples 1-11, wherein the at least one computer is external to the brain and configured to wirelessly communicate with the at least one sensor.

Example 13: The system of any of Examples 1-12, wherein the at least one computer is external to the brain and is configured to communicate with the at least one sensor via a wired connection.

Example 14: A method comprising: detecting, by at least one sensor, a plurality of activity data associated with neurons of a brain; implementing, by the at least one sensor, a compression algorithm on the plurality of activity data, the implementing including: comparing a first entropy value associated with a first set of data points of the plurality of activity data with a second entropy value associated with a second set of data points of the plurality of activity data; and combining the first set of data points responsive to determining that the first entropy value is lower than the second entropy value; and transmitting, by the at least one sensor, the combination of the first set of data points to a computer.

Example 15: The method of Example 14, wherein the at least one sensor is a neural implant that is embedded in the brain.

Example 16: The method of Example 14 or Example 15, wherein the at least one sensor includes a probe, a processor including at least a multiplexer, and a battery.

Example 17: The method of any of Examples 14-16, wherein the probe of the at least one sensor is configured to detect the plurality of activity data associated with the neurons.

Example 18: The method any of Examples 14-17, wherein the combining of the first set of data points comprising: routing a first neural activity data of the plurality of activity data corresponding to a first set of neurons to a first input of the multiplexer and a second neural activity data corresponding to a second set of neurons of the plurality of activity data to a second input of the multiplexer; and aggregating the first neural activity data routed to the first input of the multiplexer and the second neural activity data routed to the second input of the multiplexer.

Example 19: The method of any of Examples 14-18, wherein the combining of the first set of data points further including generating, via a first output of the multiplexer, a first compressed data output that includes the first neural activity data and the second neural activity data.

Example 20: The method of any of any of Examples 14-19, wherein the implementation of the compression algorithm comprising: comparing a third entropy value associated with a third set of data points of the plurality of activity data with a fourth entropy value associated with a fourth set of data points of the plurality of activity data; and combining the third set of data points responsive to determining that the third entropy value is lower than the fourth entropy value.

Example 21: At least one non-transitory computer readable media storing instructions that, when executed by at least one processor, cause the at least one processor to perform operations comprising: detecting a plurality of activity data associated with neurons of a brain; implementing a compression algorithm on the plurality of activity data, the implementing including: comparing a first entropy value associated with a first set of data points of the plurality of activity data with a second entropy value associated with a second set of data points of the plurality of activity data; and combining the first set of data points responsive to determining that the first entropy value is lower than the second entropy value; and transmitting the combination of the first set of data points.

Example 22: A system comprising: an neural activity detecting module configured to detect a plurality of activity data associated with neurons of the brain; a data compression module configured to implement a compression algorithm on the plurality of activity data by: comparing a first entropy value associated with a first set of data points of the plurality of activity data with a second entropy value associated with a second set of data points of the plurality of activity data, and combining the first set of data points responsive to determining that the first entropy value is lower than the second entropy value; and a communication module configured to transmit the combination of the first set of data points to the at least one computer.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
   at least one computer that is communicatively coupled with at least one sensor:
   the at least one sensor is embedded in a brain and configured to:

detect a plurality of activity data associated with neurons of the brain;

implement a compression algorithm on the plurality of activity data, the implementing including:

comparing a first entropy value associated with a first set of data points of the plurality of activity data with a second entropy value associated with a second set of data points of the plurality of activity data; and combining the first set of data points responsive to determining that the first entropy value is lower than the second entropy value; and transmit the combination of the first set of data points to the at least one computer.

2. The system of claim 1, wherein the at least one sensor is a neural implant that is embedded in the brain.

3. The system of claim 1, wherein the at least one sensor includes a probe, a processor including at least a multiplexer, and a battery.

4. The system of claim 3, wherein the probe of the at least one sensor is configured to detect the plurality of activity data associated with the neurons.

5. The system of claim 3, wherein the combining of the first set of data points by the at least one sensor includes the at least one sensor:

routing a first neural activity data of the plurality of activity data corresponding to a first set of neurons to a first input of the multiplexer and a second neural activity data corresponding to a second set of neurons of the plurality of activity data to a second input of the multiplexer; and aggregating the first neural activity data routed to the first input of the multiplexer and the second neural activity data routed to the second input of the multiplexer.

6. The system of claim 5, wherein the combining of the first set of data points by the at least one sensor further includes the at least one sensor generating, via a first output of the multiplexer, a first compressed data output that includes the first neural activity data and the second neural activity data.

7. The system of claim 3, wherein the implementation of the compression algorithm by the at least one sensor includes the at least one sensor:

comparing a third entropy value associated with a third set of data points of the plurality of activity data with a fourth entropy value associated with a fourth set of data points of the plurality of activity data; and combining the third set of data points responsive to determining that the third entropy value is lower than the fourth entropy value.

8. The system of claim 7, wherein the combining of the third set of data points by the at least one sensor includes the at least one sensor:

routing a third neural activity data of the plurality of activity data corresponding to a third set of neurons to a third input of the multiplexer and a fourth neural activity data corresponding to a fourth set of neurons of the plurality of activity data to a fourth input of the multiplexer; and aggregating the third neural activity data routed to the third input of the multiplexer and the fourth neural activity data routed to the fourth input of the multiplexer.

9. The system of claim 8, wherein the combining of the third set of data points by the at least one sensor further includes the at least one sensor generating, via a second output of the multiplexer, a second compressed data output that includes the third neural activity data and the fourth neural activity data.

10. The system of claim 1, wherein the implementation of the compression algorithm by the at least one sensor includes the at least one sensor configured to determine trajectories of latent variables associated with the first set of data points and the second set of data points.

11. The system of claim 10, wherein the determination of the trajectories of the latent variables is based on Gaussian Process Factor Analysis.

12. The system of claim 1, wherein the at least one computer is external to the brain and configured to wirelessly communicate with the at least one sensor.

13. The system of claim 1, wherein the at least one computer is external to the brain and is configured to communicate with the at least one sensor via a wired connection.

14. A method comprising:

detecting, by at least one sensor, a plurality of activity data associated with neurons of a brain;

implementing, by the at least one sensor, a compression algorithm on the plurality of activity data, the implementing including:

comparing a first entropy value associated with a first set of data points of the plurality of activity data with a second entropy value associated with a second set of data points of the plurality of activity data; and combining the first set of data points responsive to determining that the first entropy value is lower than the second entropy value; and transmitting, by the at least one sensor, the combination of the first set of data points to a computer.

15. The method of claim 14, wherein the at least one sensor is a neural implant that is embedded in the brain.

16. The method of claim 14, wherein the at least one sensor includes a probe, a processor including at least a multiplexer, and a battery.

17. The method of claim 16, wherein the probe of the at least one sensor is configured to detect the plurality of activity data associated with the neurons.

18. The method of claim 16, wherein the combining of the first set of data points comprising:

routing a first neural activity data of the plurality of activity data corresponding to a first set of neurons to a first input of the multiplexer and a second neural activity data corresponding to a second set of neurons of the plurality of activity data to a second input of the multiplexer; and aggregating the first neural activity data routed to the first input of the multiplexer and the second neural activity data routed to the second input of the multiplexer.

19. The method of claim 18, wherein the combining of the first set of data points further including generating, via a first output of the multiplexer, a first compressed data output that includes the first neural activity data and the second neural activity data.

20. The method of claim 14, wherein the implementation of the compression algorithm comprising:

comparing a third entropy value associated with a third set of data points of the plurality of activity data with a fourth entropy value associated with a fourth set of data points of the plurality of activity data; and combining the third set of data points responsive to determining that the third entropy value is lower than the fourth entropy value.

21. At least one non-transitory computer readable media storing instructions that, when executed by at least one processor, cause the at least one processor to perform operations comprising:
- detecting a plurality of activity data associated with neurons of a brain;
- implementing a compression algorithm on the plurality of activity data, the implementing including:
  - comparing a first entropy value associated with a first set of data points of the plurality of activity data with a second entropy value associated with a second set of data points of the plurality of activity data; and
  - combining the first set of data points responsive to determining that the first entropy value is lower than the second entropy value; and
- transmitting the combination of the first set of data points.

22. A system comprising:
- an neural activity detecting module configured to detect a plurality of activity data associated with neurons of a brain;
- a data compression module configured to implement a compression algorithm on the plurality of activity data by:
- comparing a first entropy value associated with a first set of data points of the plurality of activity data with a second entropy value associated with a second set of data points of the plurality of activity data, and
- combining the first set of data points responsive to determining that the first entropy value is lower than the second entropy value; and
- a communication module configured to transmit the combination of the first set of data points to at least one computer.

\* \* \* \* \*